Jan. 8, 1946.    B. L. READMAN ET AL    2,392,504
POWER TRANSMISSION
Filed Sept. 9, 1940
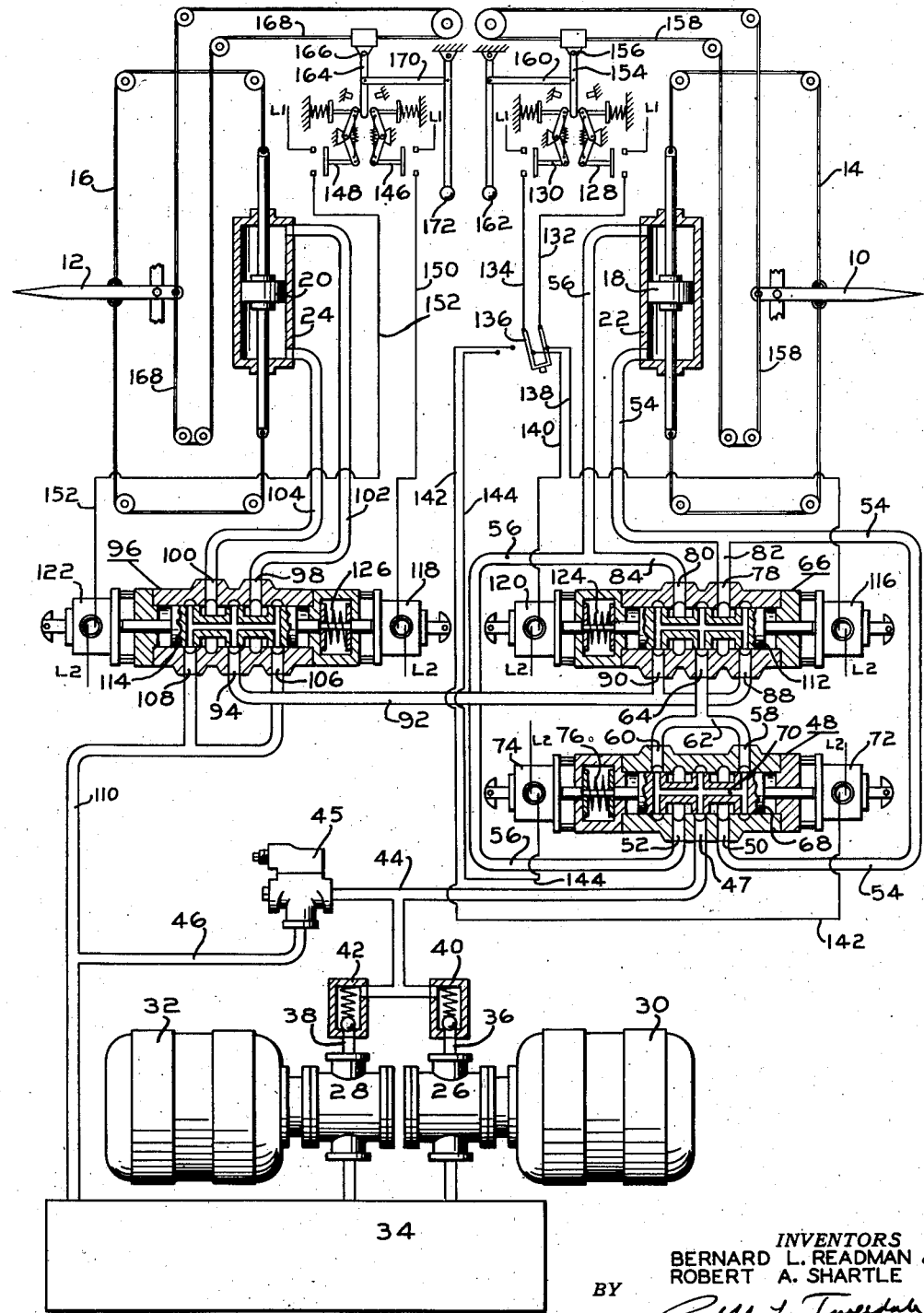
INVENTORS
BERNARD L. READMAN &
ROBERT A. SHARTLE
BY
Ralph L. Tweedale
ATTORNEY

UNITED STATES PATENT OFFICE 2,392,504

POWER TRANSMISSION

Bernard L. Readman, Detroit, Mich., and Robert A. Shartle, Rockford, Ill., assignors to Vickers Incorporated, Detroit, Mich., a corporation of Michigan Application September 9, 1940, Serial No. 355,918

3 Claims. (Cl. 60—52)

This invention relates to power transmissions, particularly to those of the type comprising two or more fluid pressure energy translating devices one of which may function as a pump and another as a fluid motor.

The invention is more particularly concerned with a hydraulic power transmission system adapted for operating a marine steering gear. Electrohydraulic steering gears have long been in practically universal use for operating the rudder on vessels of the larger and faster classes. As used in this class of service, such steering gears are rather costly and prohibit the use of similar equipment in a large field of marine applications where economy in construction is an important consideration. A large number of freighters, tankers, trawlers, ferries, etc., are compelled to get along without the many advantages of hydraulic steering because of the excessive cost of such steering gears as are commonly used in marine service.

It is accordingly an object of the present invention to produce an electrohydraulic steering gear of very low first cost yet which provides satisfactory operation in the class of marine service above indicated.

A further object is to provide an electrohydraulic steering gear of this character wherein duplicate standby equipment may be provided at low cost so as to enable a vessel to proceed in the event of dearrangement of the normally used portions of the steering gear.

It is also an object to provide an electrohydrauiic steering gear of this character which is economical in operation and maintenance as well as in first cost and which is reliable and durable for a long and useful life.

Further objects and advantages of the present invention will be apparent from the following description, reference being had to the accompanying drawing wherein a preferred form of the present invention is clearly shown.

In the drawing the single figure is a diagrammatic view of a hydraulic power transmission system embodying a preferred form of the present invention.

The invention is disclosed as applied to a steering gear for a river barge having both fore and aft rudders designated 10 and 12, respectively. The rudders are connected by a cable system 14 and 16 with hydraulic rams 18 and 20 slidable in stationary cylinders 22 and 24 which thus constitute the usual hydraulic motor or ram for rudder operation.

For the purpose of supplying fluid under pressure to operate the ram a pair of alternately usable pumps 26 and 28 are provided and may be driven by separate prime movers such as electric motors 30 and 32. The pumps are arranged to withdraw fluid from a supply tank 34, their discharge conduits 36 and 38 extending through check valves 40 and 42 to a common pressure supply line 44. The latter has the customary overload pressure relief valve 45 for bypassing the pump delivery to tank through a return conduit 46 whenever a predetermined pressure is exceeded in the supply line 44.

It is evident that either of the pumps 26 or 28 may be operated at one time and that the check valve associated with the other pump will prevent the application of pressure in the supply line 44 from reaching the idle pump. The purpose of this construction is, of course, solely for emergency protection to provide standby prime mover and pumping equipment in the event of failure of one of the prime movers or pumps.

The supply line 44 leads to the pressure port 47 of a solenoid-operated, spring-centered, open-center, multi-way directional control valve 48. The latter has cylinder ports 50 and 52 which are connected by conduits 54 and 56 with the opposite ends of motor 22. The valve 48 is also provided with return ports 58 and 60 which are connected together by a conduit 62 leading to the pressure port 64 of a duplicate valve 66 which may be identical to the valve 48.

The valve 48 has a three-land spool 68 provided with a central internal passage 70 which communicates through radial bores with the three ports 47, 58 and 60 when the spool 68 is in its neutral position. Pusher-type solenoids 72 and 74 are provided at opposite ends of the valve to shift the spool 68 to the left and right, respectively. A spring-centering mechanism 76 normally retains the valve spool 68 in the neutral position illustrated when neither solenoid is energized.

The valve 66 has its cylinder ports 78 and 80 connected by conduits 82 and 84 with the conduits 54 and 56 so that, with respect to the cylinder ports of the valves 48 and 66, the two valves are connected in parallel with the cylinder 22. The tank ports 88 and 90 of valve 66 are joined by a conduit 92 with the pressure port 94 of a third reverse valve 96 which is also identical in construction with the valve 48. It will thus be seen that the two valves 48 and 66 are connected in series as regards the pressure supply and return conduits.

The cylinder ports 98 and 100 of the valve 96 connect by conduits 102 and 104 with the opposite ends of cylinder 24. The tank ports 106 and 108 of valve 96 are connected together and communicate with the tank 34 by the conduit 110. The spools 112 and 114 of the valves 66 and 96, respectively, are adapted to be shifted to the left by solenoids 116 and 118 and to the right by solenoids 120 and 122. Spring-centering mechanisms 124 and 126 normally bias the spools to their central neutral positions as illustrated.

For the purpose of selectively energizing the various solenoids, an electrical control circuit is provided as follows: A pair of snap-acting limit switches 128 and 130 which are spring biased to normally open position are arranged to control circuits 132 and 134 extending, respectively, to a double-pole, double-throw, selector switch 136. The selector switch is adapted to selectively connect the circuit conductors 132 and 134 either with conductors 138 and 140 leading to the solenoids 116 and 120, respectively, or to the conductors 142 and 144 leading to the solenoids 72 and 74, respectively. Connection to a suitable source of electric power is made at one side of the limit switches indicated at $L^1$ and at one side of the solenoids indicated at $L^2$. Similarly limit switches 146 and 148 control circuits 150 and 152 extending directly to the solenoids 118 and 122, respectively.

The limit switches 128 and 130 are normally spring biased to open position and may be closed by shifting of a lever 154, the fulcrum 156 of which is carried by a cable system 158 connected with the rudder 10. An intermediate point of the lever 154 is connected by a link 160 with a hand lever 162. Similarly the switches 146 and 148 are under the control of a floating lever 164, the fulcrum 166 of which is carried by a cable system 168, a link 170 connecting the lever 164 with a hand lever 172.

It will be seen that the cable systems 158 and 168 acting on the shiftable fulcrums 156 and 166 constitutes a follow-back system from the rudders 10 and 12 whereby the limit switches are under the differential control of the rudder position and the hand lever position to produce a follow-up action.

In operation, assuming that the pump 26 and motor 30 are in operation and that the selector switch is arranged to connect the conductors 132 and 134 with conductors 138 and 140, it will be seen that, so long as the hand levers 162 and 172 remain in their neutral positions illustrated, no solenoid will be energized, and all of the valve spools will lie in their neutral positions, as shown in the drawing. The pump delivery is accordingly directed through conduit 44, port 47, passage 70, ports 58 and 60, conduit 62, port 64, valve 66, conduit 92, valve 96, and conduit 110 to tank. This path imposes negligible resistance to the passage of fluid so that the motor 30 operates at substantially no load. It will also be noted that the oil in the opposite ends of cylinder 22 is trapped at the cylinder ports of both valves 48 and 66 so that the rudder 10 is effectively locked in position. The same is true of rudder 12 due to the blocking of cylinder ports 98 and 100 of valve 96.

If it is desired to shift the rudder 10 to a new position, the handle 162 may be shifted, for example, to the left, thus closing limit switch 130 and energizing solenoid 120. Spool 112 accordingly shifts to the right connecting the pressure supply from port 64 to port 80 thus directing fluid to the upper end of cylinder 22. Fluid discharged from the lower end of cylinder 22 passes through conduits 54 and 82, ports 78 and 88 of valve 66, conduit 92, valve 96 and conduit 110 to tank. Thus the rudder is shifted counterclockwise which in turn actuates the cable connection 158 and shifts the fulcrum 156 to the left. So long as the lever 162 continues to be moved at a rate corresponding to the speed of movement of rudder 10, limit switch 130 will remain closed, and the rudder will continue to move. However, as soon as the movement of lever 162 is discontinued, the rudder will continue on a small distance carrying the fulcrum 156 and thereby swinging the lever 154 counterclockwise about the pivot point on link 160 to open limit switch 130. The parts accordingly come to rest with the rudder 10 and lever 162 in a new position, the valve 66 returning to its neutral position. A similar action results if the lever 162 be moved to the right causing opposite movement of rudder 10. It will be understood that, due to the diagrammatic showing, the movements required at lever 154 to control switches 128 and 130 are much greater than would be the case in actual practice.

The operation of rudder 12 from lever 172 is similar to that described in connection with rudder 10.

Should the valve 66 or its operating solenoids or circuit become disabled, the rudder 10 can be operated under the control of valve 48 by shifting the selector switch 136 to connect solenoids 72 and 74 with the limit switches 128 and 130. The action under these conditions is identical to that previously described. It will be noted that no connections in the hydraulic circuit have to be changed for making this shiftover. The same is true, of course, should one of the pumps or motors become disabled. It will thus be seen that the present invention provides a low cost electro-hydraulic steering gear in which the pump is completely unloaded at all times when the rudder is not being operated and in which the rudder is hydraulically locked at the same time.

While the form of embodiment of the invention as herein disclosed constitutes a preferred form, it is to be understood that other forms might be adopted, all coming within the scope of the claims which follow.

What is claimed is as follows:

1. In a hydraulic marine steering gear the combination with a continuously driven fixed displacement pump and a double-acting hydraulic ram for operating a rudder, of a hydraulic circuit connecting the pump with the ram, said circuit including a multi-way reversing valve having a neutral position in which the pump is bypassed and the ram is hydraulically locked, and a standby reversing valve of similar construction, said valves being connected in series with respect to the fluid pressure supply and return lines from and to the pump and in parallel with respect to the lines to the ram.

2. In a hydraulic power transmission system the combination with a pump forming a source of fluid under pressure and a hydraulic motor to be operated by the pump, of a hydraulic circuit connecting the pump with the motor, said circuit including a multi-way reversing valve having a neutral position in which the pump is bypassed, and a standby reversing valve of similar construction, said valves being connected in series with respect to the fluid pressure supply and return lines from and to the pump and in parallel with respect to the lines to the motor.

3. In a hydraulic marine steering gear the combination with a continuously driven fixed displacement pump and a double-acting hydraulic ram for operating a rudder, of a hydraulic circuit connecting the pump with the ram, said circuit including a multi-way reversing valve having a neutral position in which the pump is bypassed and the ram is hydraulically locked, electrically-actuated means for selectively shifting said valve substantially instantaneously to a fully open position at either side of neutral position, whereby the ram may be operated in either direction at will, snap-acting circuit controlling means for controlling said shifting means, and a follow-up device for operating said circuit controlling means in response to the differential positions of the rudder and a manually controlled member.

BERNARD L. READMAN.
ROBERT A. SHARTLE.